United States Patent
Schlarb et al.

(10) Patent No.: US 8,356,056 B2
(45) Date of Patent: *Jan. 15, 2013

(54) FUNCTIONAL EXTENSIONS FOR BUSINESS OBJECTS

(75) Inventors: Uwe Schlarb, Östringen (DE); Stefan A. Baeuerle, Rauenberg (DE); Martin Hartig, Speyer (DE); Thomas Fiedler, Pfinztal (DE); Oliver Klamenz, Heidelberg (DE); Daniel Zoch, Walldorf (DE)

(73) Assignee: SAP AG, Walldorf (DE)

( * ) Notice: Subject to any disclaimer, the term of this patent is extended or adjusted under 35 U.S.C. 154(b) by 914 days.

This patent is subject to a terminal disclaimer.

(21) Appl. No.: 12/198,392

(22) Filed: Aug. 26, 2008

(65) Prior Publication Data

US 2010/0057504 A1  Mar. 4, 2010

(51) Int. Cl.
G06F 7/00 (2006.01)
G06F 17/30 (2006.01)
(52) U.S. Cl. .......................... 707/793; 707/803
(58) Field of Classification Search .............. None
See application file for complete search history.

(56) References Cited

U.S. PATENT DOCUMENTS

| 7,318,066 | B2 | 1/2008 | Kaufman et al. |
|---|---|---|---|
| 2005/0021536 | A1 | 1/2005 | Fiedler et al. |
| 2005/0172261 | A1 | 8/2005 | Yuknewicz et al. |
| 2005/0183002 | A1 | 8/2005 | Chapus |
| 2005/0229186 | A1 | 10/2005 | Mitchell et al. |
| 2006/0101091 | A1 | 5/2006 | Carbajales et al. |
| 2006/0206507 | A1 | 9/2006 | Dahbour |
| 2006/0225032 | A1 | 10/2006 | Klerk et al. |
| 2006/0230066 | A1 | 10/2006 | Kosov et al. |
| 2006/0294141 | A1 | 12/2006 | Tsang et al. |
| 2007/0088716 | A1 | 4/2007 | Brumme et al. |
| 2007/0239711 | A1 | 10/2007 | Unnebrink et al. |
| 2008/0005623 | A1 | 1/2008 | Said |
| 2008/0027893 | A1 | 1/2008 | Cavestro et al. |
| 2008/0109436 | A1 | 5/2008 | Klein et al. |
| 2008/0162536 | A1 | 7/2008 | Becker et al. |
| 2008/0162622 | A1 | 7/2008 | Becker et al. |

(Continued)

FOREIGN PATENT DOCUMENTS

EP  1 494 131 A1  1/2005

(Continued)

OTHER PUBLICATIONS

"Non-Final Office Action" mailed Dec. 23, 2010, for U.S. Appl. No. 12/198,315, entitled "Dynamic Extension Fields for Business Objects", filed Aug. 26, 2008, 10pgs.

(Continued)

*Primary Examiner* — Uyen T. Le
(74) *Attorney, Agent, or Firm* — Buckley, Maschoff & Talwalkar LLC

(57) ABSTRACT

A system may include generation of extension metadata defining a functional extension associated with a business object, and generation of a runtime metadata buffer comprising enhanced metadata, the enhanced metadata based on core metadata of the business object and the extension metadata. In some aspects, a service request associated with the business object is received, it is determined whether the service request is associated with the functional extension, an extension service associated with the functional extension is provided if it is determined that the service request is associated with the functional extension, and a core service associated with core data of the business object is provided if it is determined that the service request is not associated with the functional extension.

21 Claims, 4 Drawing Sheets

U.S. PATENT DOCUMENTS

| | | |
|---|---|---|
| 2008/0163253 A1 | 7/2008 | Massmann et al. |
| 2008/0195964 A1 | 8/2008 | Randell |
| 2008/0275844 A1 | 11/2008 | Buzsaki et al. |
| 2008/0319942 A1 | 12/2008 | Courdy et al. |
| 2010/0057771 A1 | 3/2010 | Baeuerle et al. |
| 2010/0057776 A1 | 3/2010 | Baeuerle et al. |
| 2010/0161648 A1 | 6/2010 | Eberlein et al. |
| 2010/0162147 A1 | 6/2010 | Ritter et al. |
| 2012/0023130 A1 | 1/2012 | Schlarb et al. |

FOREIGN PATENT DOCUMENTS

| | | |
|---|---|---|
| WO | 2005/098593 A2 | 10/2005 |

OTHER PUBLICATIONS

"Non-Final Office Action" mailed Dec. 23, 2010, for U.S. Appl. No. 12/198,351, entitled "Dynamic Node Extensions and Extension Fields for Business Objects", filed Aug. 26, 2008, 11pgs.

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

"European Search Report of the European Patent Office", mailed Oct. 26, 2009, for EP 09011216.0—1243, 1pg.

"Non-Final Office Action" mailed Mar. 23, 2011, for U.S. Appl. No. 12/339,328, entitled "UI-Driven Biding of Extension Fields for Business Objects", filed Dec. 19, 2008, 22pgs.

"Non-Final Office Action" mailed Aug. 1, 2011, for U.S. Appl. No. 12/339,392, entitled "Flexable Multi-Tenant Support of Metadata Extensions", filed Dec. 19, 2008, 20pgs.

"Final Office Action" mailed Oct. 4, 2011, for U.S. Appl. No. 12/339,328, entitled "UI-Driven Biding of Extension Fields for Business Objects", filed Dec. 19, 2008, 16pgs.

"Final Office Action" mailed May 11, 2011, for U.S. Appl. No. 12/198,351, entitled "Dynamic Node Extensions and Extension Fields for Business Objects", filed Aug. 26, 2008, 7pgs.

"Final Office Action" mailed May 11, 2011, for U.S. Appl. No. 12/198,315, entitled "Dynamic Extension Fields for Business Objects", filed Aug. 26, 2008, 5pgs.

"Final Office Action" mailed Jan. 9, 2012, for U.S. Appl. No. 12/339,392, entitled "Flexible Multi-Tenant Support of Metadata Extensions", filed Dec. 19, 2008, 26pgs.

"Non-Final Office Action" mailed Feb. 16, 2012, for U.S. Appl. No. 12/843,291, entitled "Facilitation of Extension Field Usage Based on Reference Field Usage", filed Jul. 26, 2010, 28pgs.

Joseph W. Yoder et al., "Architecture and Design of Adaptive Object-Models", ACM SIGPLAN Notices, XP-002249967, vol. 36, No. 12, Dec. 2001, (pp. 50-60, 11 pages total).

"Non-Final Office Action" mailed May 9, 2012, for U.S. Appl. No. 12/339,328, entitled "UI-Driven Binding of Extension Fields to Business Objects", filed Dec. 19, 2008, 28pgs.

"Non-Final Office Action" mailed Mar. 28, 2012, for U.S. Appl. No. 12/838,594, entitled "Field Extensibility Using Generic Boxed Components", filed Jul. 20, 2010, 14pgs.

Willis, G., "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

Taylor, Mary et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

Joseph W. Yoder et al., "Architecture and Design of Adaptive Object-Models", ACM SIGPLAN Notices, XP-002249967, vol. 36, No. 12, Dec. 2001, pp. 50-60 (total 11 pages).

"European Search Report", dated Oct. 13, 2009, for European Application No. 09011280.6, 2pgs.

"European Search Report of the European Patent Office", mailed Oct. 26, 2009, for EP 09011216.0-1243, 2pg2.

Uwe Schlarb et al., U.S. Appl. No. 12/838,594, entitled "Fields Extensibility Using Generic Boxed Components", filed Jul. 19, 2010.

Uwe Schlarb et al., U.S. Appl. No. 12/843,291, entitled "Facilitation of Extension Field Usage Based on Reference Field Usage", filed Jul. 26, 2010.

Peter Eberlein et al., U.S. Appl. No. 12/339,392, entitled "Flexible Multi-Tenant Support of Metadata Extension", filed Dec. 19, 2008.

Gerd M. Ritter et al., U.S. Appl. No. 12/339,328, entitled "UI-Driven Binding of Extension Fields to Business Objects", filed Dec. 19, 2008.

FUNCTIONAL EXTENSIONS FOR BUSINESS OBJECTS

FIELD

Some embodiments relate to business objects supported by a business process platform. More specifically, some embodiments relate to functional extensions for business objects within a business process platform.

BACKGROUND

A business object is a software entity representing real-world items used during the transaction of business. For example, a business object may represent a business document such as a sales order, a purchase order, or an invoice. A business object may also represent items such as a product, a business partner, or a piece of equipment.

A business object may include business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

A customer deploying a business solution may desire changes to the business objects included in the business solution. For example, a customer may require additional business logic (i.e., functional extensions) associated with fields of a business object.

Commonly-assigned and co-pending patent application U.S. Ser. Nos. (Dynamic Extension Fields for Business Objects, 12/198/315) and (Dynamic Node Extensions and Extension Fields for Business Objects, 12/198,351) describe systems for adding extension fields to a business object. A customer may require functional extensions associated with the extension fields, such as logic to calculate the value of an extension field based on other fields of the business object (e.g., a value of extension field "OverallAmount" of the "PurchaseOrder" business object). Functional extensions may also be desired for performing integrity checks on the extension fields, and/or for persistency handling related to the extension fields.

Conventionally, functional extensions are added to a business object by employing class extensions at the technical implementation level. Components of the database system relating to the extensions must be recompiled to effect such a change, and the change occurs globally with respect to all instantiations of the business object within the system. In some scenarios, particularly service-on-demand scenarios, multiple customers (tenants) receive services from a single application platform. If one of the multiple tenants adds functional extensions to a business object using class extensions, each other tenant would be forced to adapt to the additional extension logic.

Systems for adding functional extensions to a business object are desired. Such a system may reduce a need for recompiling the application platform, may enable one or more tenants to add respective functional extensions, and/or may provide tenant-specific views provided by tenant-specific functional extensions.

DETAILED DESCRIPTION

Figure 1:
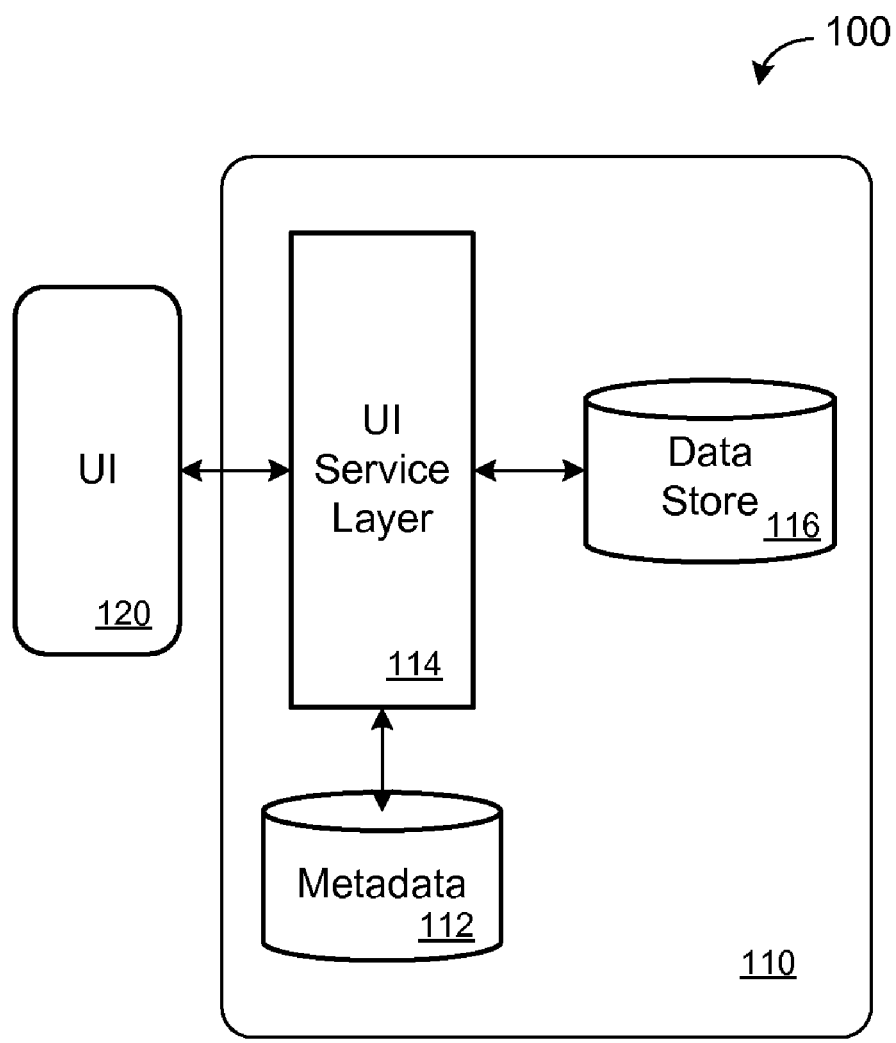
FIG. 1 is a block diagram of components to add a functional extension to a business object according to some embodiments.

FIG. 1 is a block diagram of system 100 according to some embodiments. System 100 includes business process platform 110 and user interface 120. Generally, business process platform 110 may provide services to user interface 120 according to some embodiments. Business process platform 110 may comprise an SAP application platform based on SAP Netweaver®, but is not limited thereto. In this regard, FIG. 1 represents a logical architecture for describing processes according to some embodiments, and actual implementations may include more or different components arranged in other manners.

Business process platform 110 may provide services based on business objects as described above. Metadata 112 may include information defining the structure and attributes of these business objects. UI service layer 116 may use metadata 112 to access and manipulate business object data stored in data store 118.

An operator (e.g., a key user) may manipulate user interface 120 to interact with UI service layer 116 according to some embodiments. Such interactions may include requesting business object views, modifying business object data, and defining business object views. User interface 120 may be displayed by any suitable device. For example, the device may include any necessary software to support a proprietary interface (e.g., a proprietary client application) or execution engine (e.g., a Web browser). A device to display the user interfaces is capable of communication (including sporadic communication—e.g., mobile devices) with business process platform 110.

Figure 2:
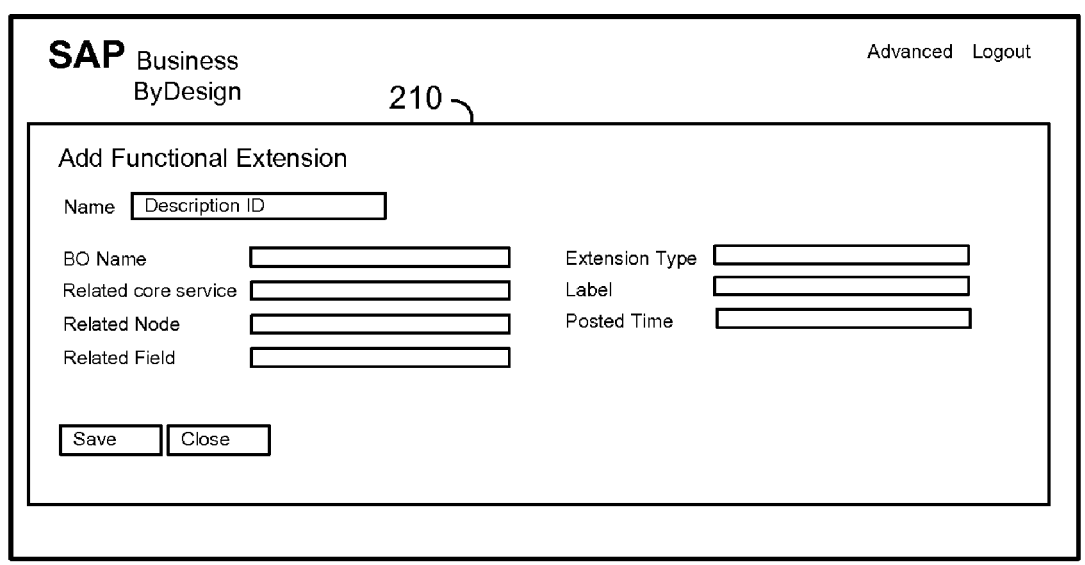
FIG. 2 is a view of a user interface for adding a functional extension to a business object according to some embodiments.

FIG. 2 illustrates user interface 200 according to some embodiments. The developer may access user interface 200 through a user interface adaptation dialog provided by UI service layer 116. User interface 200 allows the developer to define a functional extension associated with a business object.

A functional extension may comprise executable program code. In some embodiments, a functional extension may comprise one or more Advanced Business Application Programming (ABAP) classes providing associated functionality. The functionality may incorporate extension fields as mentioned above, core fields, and any other information available to platform 110. A functional extension may implement one or more interfaces to provide such functionality.

A developer may populate the fields of area 210 to define a new functional extension node. According to the illustrated embodiment, the fields allow a developer to define a name of the functional extension and to identify a business object and related core service with which the functional extension node is associated. Area 210 may include other or different fields according to some embodiments, and such fields may be populated using drop-down menus or any other input mechanism.

In response to the manipulation of dialog 200, metadata 112 is changed to associate the functional extension with the business object. Many systems and approaches may be employed to represent the functional extension within metadata 112. For each functional extension, metadata 112 may include an extension name and a name of a business object with which the functional extension is associated. Metadata 112 may also include a technical (e.g., ABAP) name of the functional extension.

Figure 3:
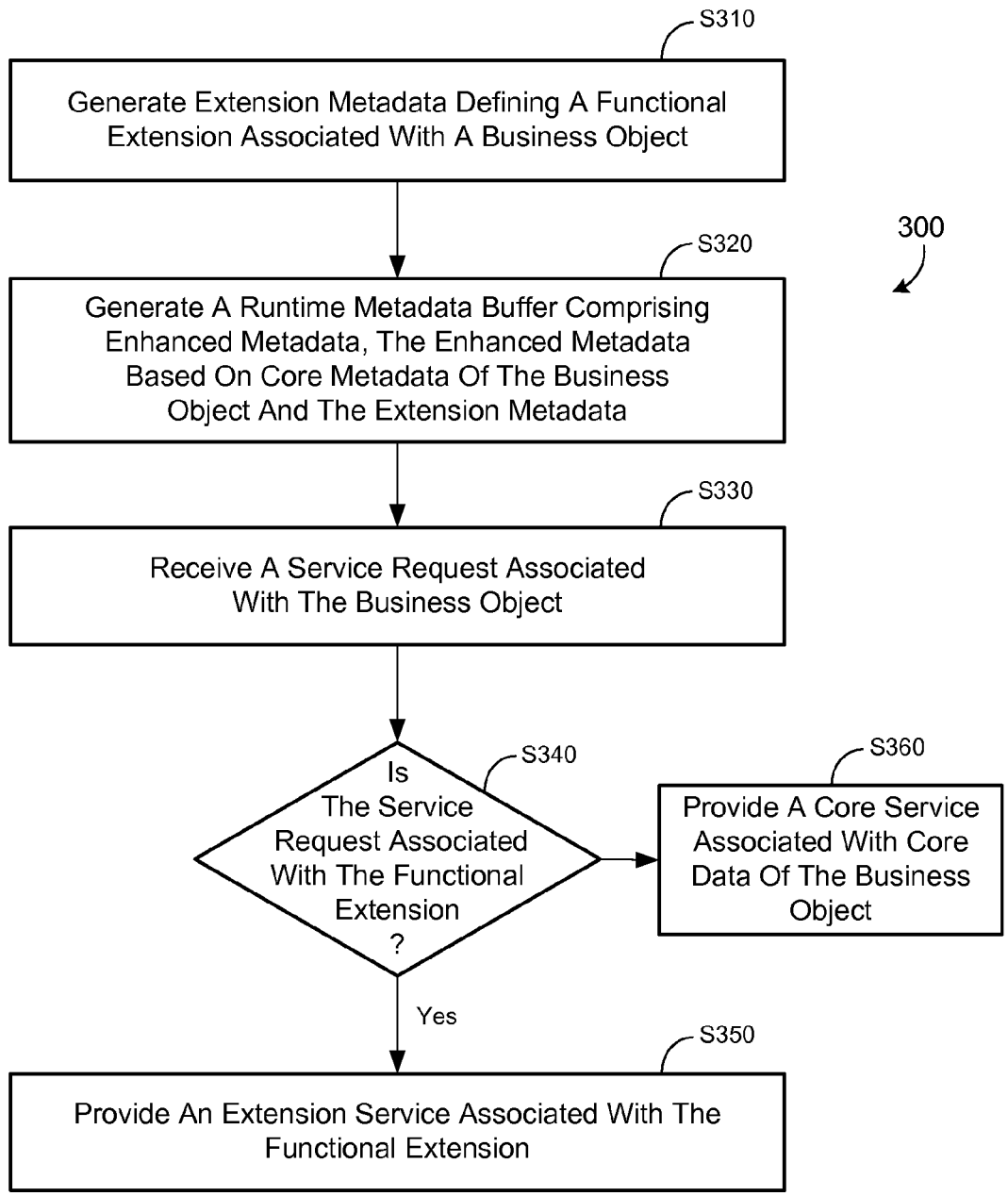
FIG. 3 is a flow diagram of a process according to some embodiments.
Figure 4:
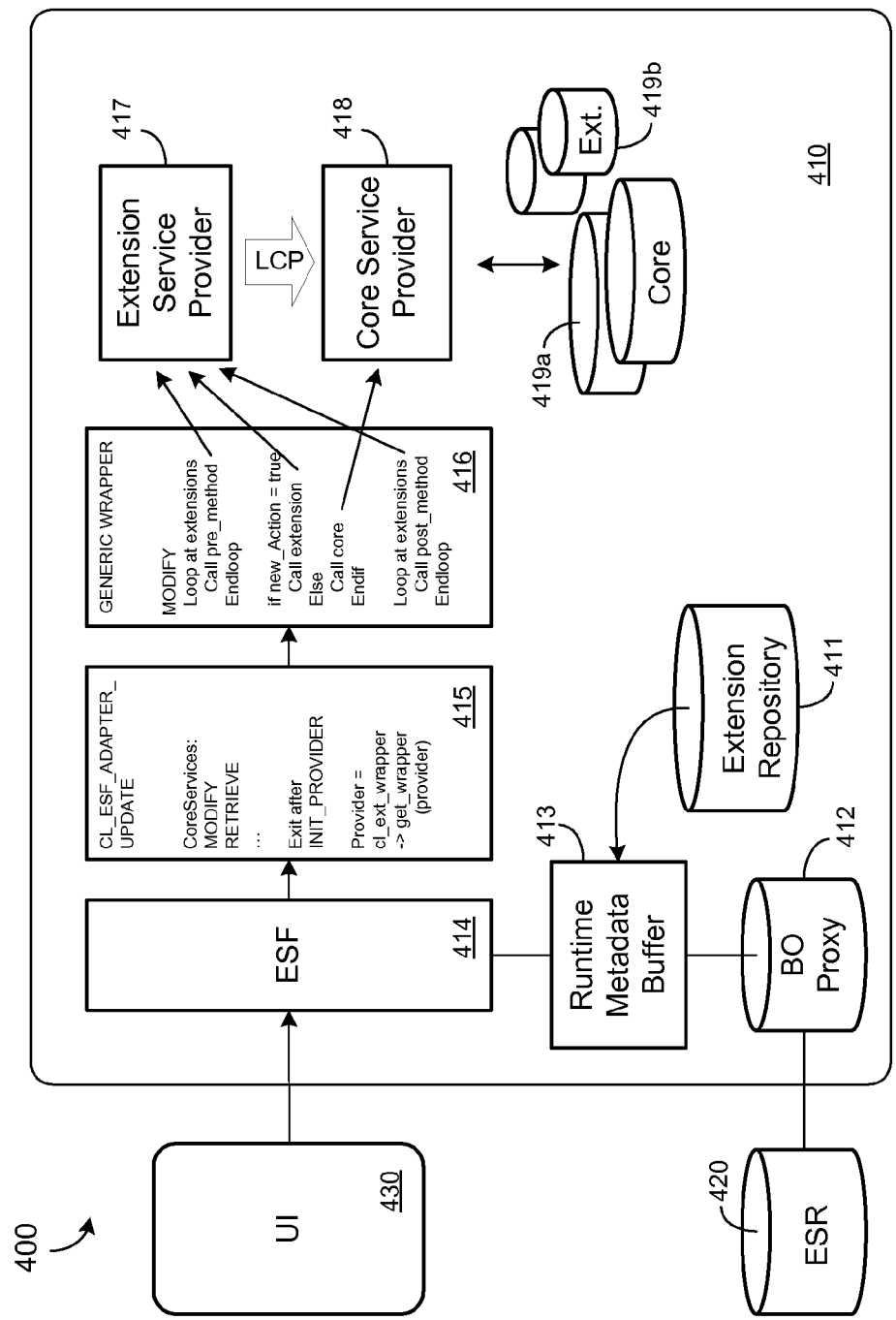
FIG. 4 is a detailed block diagram of a system according to some embodiments.

FIG. 3 is a flow diagram of process 300 to support functional extensions according to some embodiments. FIG. 4 is a detailed block diagram of system 400 to execute process 300 according to some embodiments. Process 300 may be executed by systems differing from system 400, and system 400 is not limited to process 300.

Initially, extension metadata is generated at S310. The extension metadata defines a functional extension associated with a business object. According to some embodiments, the extension metadata is generated by a development tool during design time.

The extension metadata may comprise a functional extension name, and a name of a business object with which the functional extension is associated. The extension metadata may also include a technical name of the functional extension, and may be generated and stored in a tenant-specific manner. According to some embodiments of S310, the extension metadata is generated and stored within extension repository 411 of business process platform 410. The extension metadata may be stored in any other entity within application platform 410.

The extension metadata may be generated at S310 during execution of platform 410. In this regard, enterprise services repository 420 may include business object models for use by platform 410. For each business object model, a business object proxy 412 including core business object metadata is generated in platform 410.

A runtime metadata buffer including enhanced metadata is generated at S320. The enhanced metadata is based on core metadata of a business object and the extension metadata of the business object generated at S310. In the FIG. 4 example, runtime metadata buffer 413 is generated to include enhanced metadata based on the core metadata of business object proxy 412 and the extension metadata of extension repository 411. The enhanced metadata may include all functional extensions defined in platform 410, or may include only functional extensions specific to a particular tenant.

Next, at S330, a service request associated with the business object is received. For example, business process platform 410 may receive a "modify" or "retrieve" request from user interface 430 at S330. The request is directed to ESF framework 414.

According to conventional operation, ESF framework 414 then calls an appropriate core service provider via adapter class 415 based on metadata associated with the business object in buffer 413. Next, and in contrast to conventional operation, it is determined at S340 whether the received service request is associated with the functional extension.

In some embodiments of S340, generic wrapper 416 is instantiated directly after processing INIT_PROVIDER of adapter class 415. Generic wrapper 416 determines whether the received service request is associated with the functional extension based on the enhanced metadata of extension repository 411, and/or on similarly-enhanced metadata stored in an extension registry (not shown). Flow proceeds to S350 if it is determined that the service request is associated with the functional extension.

At S350, an extension service associated with the functional extension is provided. FIG. 4 illustrates extension service provider 417 being called by generic wrapper 416 for implementing Pre- and Post-exits of existing core service methods, and for implementing new actions.

Extension service provider 417 may comprise a class implementing a set of well-defined interfaces. The interfaces of extension service provider 417 may provide initialization of the extension in order to obtain an instance of a local client proxy (LCP) to communicate with core service provider 418. As mentioned above, the interfaces may implement pre- and post-exits for existing core services. For example:

---

IF_EXT_PROVIDER_ACCESS
   PRE_MODIFY
   POST_MODIFY
   PRE_RETRIEVE
   POST_RETRIEVE
   ...
IF_EXT_PROVIDER_ACTION
   PRE_EXECUTE_ACTION
   POST_EXECUTE_ACTION
   ...

---

Generally, signatures of the foregoing methods may be derived from the signature of the corresponding core services (e.g., EXPORTING parameters become CHANGING parameters). In some implementations additional parameters are added to the functional extension. For example, for PRE_EXECUTE_ACTION the additional parameter OUT_DO_NOT_EXECUTE_ACTION is added. This additional parameter may be set to 'X' to prevent execution of the associated core service.

Core service provider 418 is called at S350 to provide a core service. The core service is associated with extension data of the extension node. More specifically, extension service provider 417 may use an LCP instance to request a core service from core service provider 418. The core service may support extension data of one or more extension fields of the extension node.

Returning to S340, generic wrapper 416 may determine that the service request is not associated with the functional extension. Flow then proceeds to S360, at which point generic wrapper 416 directly calls core service provider 418 to provide a core service associated with the core data of the business object. Core service provider 418 may access core data 419*a* to provide core services based on the request. In the illustrated example, core data 419*a* is stored separately from extension data 419*b*.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
   generating, by a computer, extension metadata defining a functional extension associated with a business object; and
   generating, by a computer, a runtime metadata buffer comprising enhanced metadata, the enhanced metadata based on core metadata of the business object and the extension metadata.

2. A method according to claim 1, further comprising:
   generating, by a computer, a business object proxy comprising the core metadata of the business object based on a model of the business object,
   wherein, by a computer, the enhanced metadata is generated based on the core metadata of the business object proxy.

3. A method according to claim 2, wherein the model of the business object is stored in an enterprise services repository,
   wherein the business object proxy is generated in a business process platform, and
   wherein the extension metadata is stored in an extension repository of the business process platform.

4. A method according to claim 1, further comprising:
   receiving, by a computer, a service request associated with the business object;
   determining, by a computer, whether the service request is associated with the functional extension;
   if it is determined that the service request is associated with the functional extension, providing, by a computer, an extension service associated with the functional extension; and
   if it is determined that the service request is not associated with the functional extension, providing, by a computer, a core service associated with core data or core logic of the business object.

5. A method according to claim 4,
   wherein determining whether the service request is associated with the functional extension is based on the enhanced metadata of the runtime metadata buffer.

6. A method according to claim 4, further comprising:
   providing, by a computer, a core service associated with the business object if it is determined that the service request is associated with the functional extension.

7. A method according to claim 1,
   wherein the extension repository stores extension metadata associated with a plurality of database tenants, and
   wherein the enhanced metadata is associated with a single database tenant.

8. A system comprising:
   an extension repository storing extension metadata defining a functional extension associated with a business object; and
   a runtime metadata buffer comprising enhanced metadata, the enhanced metadata based on core metadata of the business object and the extension metadata.

9. A system according to claim 8, further comprising:
   a business object proxy comprising the core metadata of the business object,
   wherein the enhanced metadata is based on the core metadata of the business object proxy.

10. A system according to claim 9, further comprising:
    an enterprise services repository storing a model of the business object; and
    a business process platform comprising the business object proxy and the extension repository.

11. A system according to claim 8, further comprising:
    an enterprise services framework to receive a service request associated with the business object;
    a generic wrapper class to determine whether the service request is associated with the functional extension;
    an extension service provider to provide an extension service associated with the functional extension if it is determined that the service request is associated with the functional extension; and
    a core service provider to provide a core service associated with core data of the business object if it is determined that the service request is not associated with the functional extension.

12. A system according to claim 11,
    wherein the generic wrapper class is to determine whether the service request is associated with the functional extension based on the enhanced metadata of the runtime metadata buffer.

13. A system according to claim 11, wherein the extension service provider is to call the core service provider to provide a core service associated with the business object.

14. A system according to claim 8,
    wherein the extension repository stores extension metadata associated with a plurality of database tenants, and
    wherein the enhanced metadata is associated with a single database tenant.

15. A non-transitory computer readable medium storing program code executable by a computer to perform a method, the method comprising:
    generating extension metadata defining a functional extension associated with a business object; and
    generating a runtime metadata buffer comprising enhanced metadata, the enhanced metadata based on core metadata of the business object and the extension metadata.

16. A medium according to claim 15, the method further comprising:
    generating a business object proxy comprising the core metadata of the business object based on a model of the business object,
    wherein the enhanced metadata is generated based on the core metadata of the business object proxy.

17. A medium according to claim 16, wherein the model of the business object is stored in an enterprise services repository,
    wherein the business object proxy is generated in a business process platform, and
    wherein the extension metadata is stored in an extension repository of the business process platform.

18. A medium according to claim 15, the method further comprising:
    receiving a service request associated with the business object;
    determining whether the service request is associated with the functional extension;
    if it is determined that the service request is associated with the functional extension, providing an extension service associated with the functional extension; and
    if it is determined that the service request is not associated with the functional extension, providing a core service associated with core data or core logic of the business object.

19. A medium according to claim 18,
    wherein determining whether the service request is associated with the functional extension is based on the enhanced metadata of the runtime metadata buffer.

20. A medium according to claim 18, the method further comprising providing a core service associated with the business object if it is determined that the service request is associated with the functional extension.

21. A medium according to claim 15,
    wherein the extension repository stores extension metadata associated with a plurality of database tenants, and
    wherein the enhanced metadata is associated with a single database tenant.

* * * * *